United States Patent [19]
Fackenthal

[11] 3,724,209
[45] Apr. 3, 1973

[54] FLUID UNIT WITH DUMP AND FILL CONTROL

[75] Inventor: Harry Fackenthal, Muncie, Ind.

[73] Assignee: General Motors Corporation, Detroit, Mich.

[22] Filed: Oct. 22, 1971

[21] Appl. No.: 191,604

[52] U.S. Cl. .................................................. 60/54
[51] Int. Cl. ............................................. F16d 33/06
[58] Field of Search ..................................... 60/54

[56] References Cited

UNITED STATES PATENTS

| | | |
|---|---|---|
| 2,299,049 | 10/1942 | Ziebolz ................................. 60/54 |
| 2,898,738 | 8/1959 | Sand et al. ............................ 60/54 |
| 3,417,565 | 12/1968 | Hanson et al. ....................... 60/54 |

*Primary Examiner*—Edgar W. Geoghegan
*Attorney*—W. E. Finken et al.

[57] ABSTRACT

This hydrodynamic unit has a number of turbine fluid flow passages blocked by end walls provided between the vanes and these passages are connected by internal radial passage within the unit leading to a central discharge line. The unit will evacuate its oil by the direct tapping of the toric oil flow in the unit in response to the decrease in supply of oil to the unit torus from the controls. By controlling the amount of oil fed to the unit torus, the torque transmitting capacity of the unit is controlled.

5 Claims, 2 Drawing Figures

PATENTED APR 3 1973  3,724,209

INVENTOR.
Harry Fackenthal
BY
Charles R. White
ATTORNEY

FLUID UNIT WITH DUMP AND FILL CONTROL

This invention relates to hydrodynamic fluid units having dump and fill provisions to selectively vary the torque transmitting capacity of the unit to any capacity from zero to full capacity.

Variable capacity fluid units have been successfully employed in many different vehicle applications and with many types of power plants including gas turbine and internal combustion engines. Some of these units such as disclosed in U.S. Pat. No. 3,358,444 to R. M. Tuck have multi-bladed members whose blades can be simultaneously set at different angular positions to vary the torque absorption capacity of the unit to selectively apportion the power flow between a vehicle drive and an accessory drive.

In addition to such variable capacity units there have been others with fluid dump and fill provision for completely disconnecting or for drivingly connecting power transmission drive train members such as disclosed in the U.S. Pat. Nos. 2,898,738 to D. R. Sand et al. and 3,383,949 to J. O. Edmunds. While these prior art units with controls for varying capacity and for dumping and filling working fluid have provided substantial advancements in the power transmission field they have not provided the versatility needed in many applications where both variable capacity and complete connect and disconnect capabilities are desired.

The present invention is directed toward such a fluid unit and incorporates a built-in scavenge type evacuation system to provide for a rapid dump of the oil within the unit when desired and to provide for the quick fill when necessary.

This invention can be employed to provide important advantages in power transmission field. By using it in a fluid unit in a combined vehicle and accessory drive such as in the R. M. Tuck patent cited above, there can be full power to the accessory with complete disconnect of the engine from the drive wheels. From this point the capacity of the unit can be gradually increased until the unit has gained its full torque transmitting capability.

With this invention the capacity of the unit may be readily varied to any capacity by controlling the mass of the fluid handled by the unit. In this invention the mass of the fluid medium in the unit is reduced by reducing the supply oil fed to the unit. The oil deleted is replaced by air to reduce the specific gravity of the fluid medium in the unit so that the capacity is thereby reduced. To increase capacity, additional oil is added to replace the air. Thus by regulating the amount of oil introduced to the fluid unit it is possible to regulate the capacity of the unit as desired. Capacity may be gradually increased or decreased if desired by correspondingly increasing or decreasing the quantity of oil fed to the fluid unit in a graduated manner.

To rapidly dump all the oil from the fluid unit, the oil supplied to the fluid unit is shut off by a simple valve on the inlet or supply line. The oil in the coupling which is left in the torus is driven at very high torus speed from the pump member into blocked vane passages. This oil is forced out through special exit passages provided in the turbine hub and back to a sump or reservoir. The coupling will remain empty as a means of total disconnect in the power drive line. When it is desired to quickly resume normal torque transmitting operation of the coupling or other unit, oil under pressure is simply reintroduced into the coupling through the supply passages.

A feature and object of this invention is to provide a new and improved fluid unit to selectively vary the torque transmitting capacity of the unit between zero capacity and maximum capacity.

Another feature and object of this invention is to provide a new and improved means for rapidly evacuating a fluid unit with the provision of the blocking of a limited number of bladed passages to the unit and the provision of internal passage means with the unit torus for the direct tapping of the toric oil flow so that the unit will evacuate its own oil with the appropriate interruption of oil fed into the unit.

Another feature and object of this invention is to provide a new and improved fluid unit in which a selected number of fluid flow passages are blocked so that the fluid therein will be directed into axial discharge passages allowing the unit to evacuate its own oil either completely or partially by controlling the supply of oil to the unit through flow control means.

Another feature and object of this invention is to provide a new and improved oil discharge structure internal within the torus of a coupling or converter for either the quick or graduated dumping and filling of the fluid medium employed in the hydrodynamic unit to provide advanced controls over the transmission of power between torque transmitting input and output members.

These and other advantages, features and objects of the invention will become more apparent from the following detailed description and drawings in which.

Figure 1:
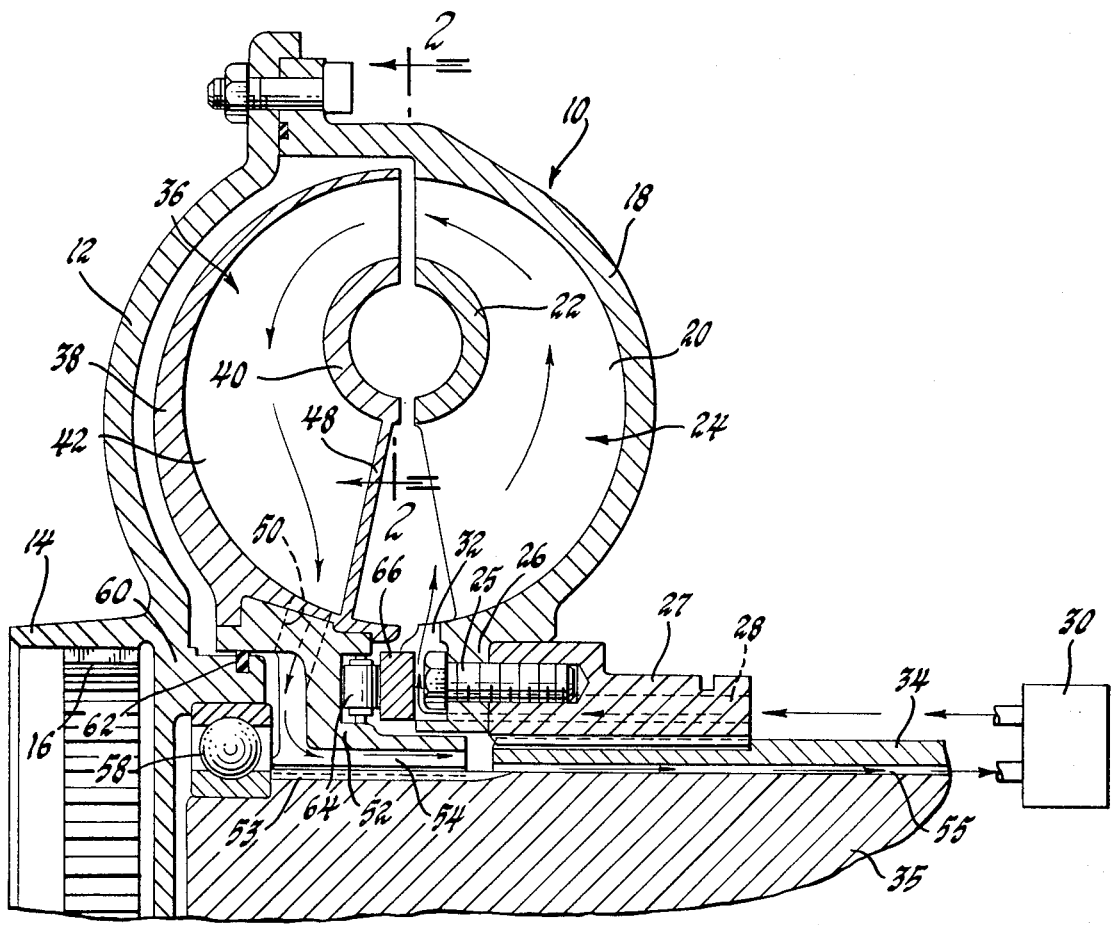
FIG. 1 is a cross sectional view of an upper portion of a fluid unit.
Figure 2:
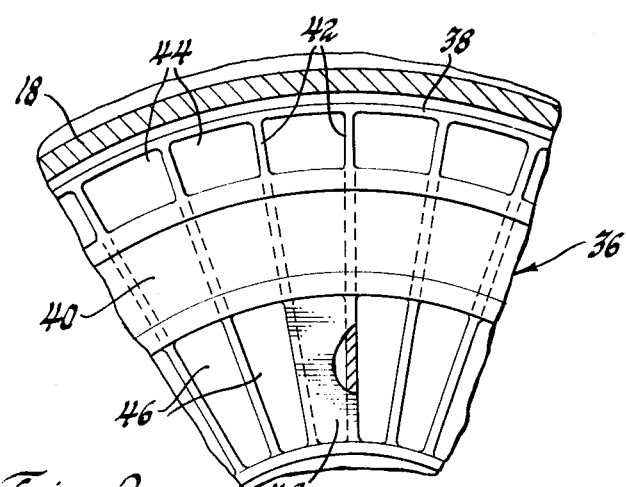
FIG. 2 is a view taken along lines 2—2 of FIG. 1.

In FIG. 1 there is illustrated a fluid coupling 10 with a rotatable front cover 12 having an input collar 14 that is internally splined at 16 for connection with the output of an engine not shown. The front cover 12 is bolted to a rotatable coupling housing 18 in which are a plurality of generally semicircular blades 20. These blades are secured side by side in an annular arrangement about the axis of rotation of the housing to an inner shell 22 and to the inside of the housing 18 to form a bladed pump assembly 24 with a plurality of separate fluid directing passages having fluid entrance and exit openings. The pump housing 18 is secured by bolts 25 which extend through an annular hub 26 integral with housing 18 into a cylindrical support sleeve 27 through which there is provided oil supply passages 28 that feed a pressure-regulated supply of transmission oil from the controls 30 to the inlet passage 32 formed in hub 26 and into the entrance openings of the pump assembly 24.

The controls 30 include suitable valve means for controlling the rate of oil flow into the coupling from zero to a maximum for controlling the torque capacity of the coupling. The support sleeve 27 is splined to a cylindrical sleeve shaft 34 which drives a conventional fluid pump within control 30 and which surrounds a rotatable torque transmitting shaft 35 extending longitudinally from the coupling.

Disposed in front of the pump assembly 24 is a rotatable turbine assembly 36 having outer and inner shells 38 and 40 which are connected by a plurality of blades 42 similar to pump blades 20 arranged side by side in an annular pattern about the rotational axis of the coupling to form a plurality of fluid directing passages 44 therebetween. The majority of these passages have exit openings 46 for directing fluid exiting from the turbine into the entrance openings of the pump assembly while the remainder passages, three of 36 for example, are provided with blocking walls 48 for diverting fluid therein down into radial openings 50 formed in outer shell 38 and in a connected annular hub 52 that is splined at 53 to the end of shaft 35.

Fluid exiting from openings 50 is directed by longitudinal passages 54 formed in the hub 52 to a discharge passage 55 formed between the sleeve shaft 34 and the main torque transmitting shaft 35. The discharge passage 55 is connected to a cooler not shown and to a sump within the controls 30.

Suitable anti friction bearings 58 are disposed between a centralized and inwardly extending shoulder 60 of the front cover 12 and the end of shaft 35 to provide for the support and the relative rotation of the pump assembly and the shaft 35. Supported on the outer periphery of shoulder 60 and concentric with the bearing 58 is an annular fluid seal 62 which contacts an inner annular projecting surface of the hub 52 to block the discharge of fluid from the space between the front cover 12 and the outer shell 38 of the turbine into the discharge passage 54. The hub 52 of the turbine supports a plurality of thrust rollers 64 disposed in a ring which contact an annular race 66 supported by the hub 26 of the pump assembly 24.

In normal operation with the coupling operating at full capacity, pressurized oil is fed from the controls into the coupling through the passages 28 and the openings 32 into the torus, provided by the pump and turbine assemblies, as shown by the flow arrows in FIG. 1. The oil circulates in a rotary and vortex flow path within the torus and is discharged into passage 55 through the openings 50 formed in the turbine shell 38 and hub 52. The seal 62 prevents the oil from recirculating back into the coupling torus. In this operating condition inlet flow and outlet flow are equal to maintain the coupling filled.

To quickly dump all the oil from the coupling, the oil to the inlet is shut off by a simple valve on the inlet line 28 which is incorporated within the controls 30. The oil which is left in the converter torus is circulated at a very high speed by the coupling pump into blade passages of the turbine assembly. Oil driven into the three blocked vane passages is forced out through the exit passages 50 provided in the turbine hub and then back to the sump or oil reservoir. Oil in the coupling immediately replaces the evacuated oil so that the blocked blade passages provide for the rapid scavenging of all the remaining oil in the coupling. The coupling remains empty as a means of total disconnect in the power drive line from input 14 to shaft 35 or from shaft 35 back to the input member 14. When it is desired to resume normal, full torque-transmitting operation of the coupling unit, the normal flow of regulated pressure oil is simply reintroduced into the coupling torus from the pump within the controls 30.

By regulating the amount of oil introduced into the coupling it is also possible to regulate the torque capacity of the coupling as desired. To reduce the torque transmitting capacity of the coupling, the amount of oil supplied to the coupling is reduced and replaced by air. This mixture of air and oil is introduced into the coupling through passages 28 and 32 from the controls 30. Since capacity depends on the mass of the fluid handled, the specific gravity of the fluid medium is reduced and the capacity of the coupling to transmit torque from the pump to the turbine is reduced. By selectively varying the specific gravity of the medium the torque transmitting capacity of the unit is selectively varied.

It will be appreciated that the fluid unit of this invention may be either a fluid coupling or a hydrodynamic torque converter. Other changes and modification may be made to this particular embodiment shown and described above which are within the spirit of the invention. Therefore this invention is not to be limited by the particular embodiment shown and described but only by the following claims.

I claim:

1. A hydrodynamic unit comprising in combination rotatable input and output means, a rotatable housing operatively connected to said input means, input rotor means having a hydraulic fluid entrance and an exit operatively connected to said housing, output rotor means operatively connected to said output means, a source of pressure fluid, fluid supply passage means hydraulically connecting said source to the said fluid entrance of said input rotor means, fluid discharge passage means hydraulically connected to said hydrodynamic unit for conducting fluid from said unit to said source, said output rotor means having a fluid entrance and a fluid exit, at least one of said rotor means having a plurality of blades disposed therein which form fluid directing passageways therebetween leading from said last mentioned entrance to said last mentioned exit, at least one of said passageways having a wall disposed between the associated blades to block the flow of fluid therefrom, discharge passage means formed in said last mentioned passageway leading generally radially inwardly into said outlet passage means to permit said blocked passageway to tap the toric fluid flow within said unit and evacuate the fluid from said unit in response to the reduction in the amount of hydraulic fluid supplied to said unit from said source.

2. A hydrodynamic unit comprising in combination rotatable input and output means, a rotatable housing operatively connected to said input means, input rotor means having a fluid entrance and a fluid exit operatively connected to said housing, output rotor means operatively connected to said output means, a source of pressure oil for said unit, fluid supply passage means hydraulically connecting said source to the said fluid entrance of said input rotor means, fluid discharge passage means hydraulically connected to said hydrodynamic unit for conducting fluid from said unit to said source, said output rotor means comprising a turbine assembly having a fluid entrance and a fluid exit and having a plurality of blades disposed therein which form fluid directing passageways therebetween leading from said last mentioned entrance to said last mentioned exit, at least one of said passageways having an end wall laterally disposed between two adjacent blades to completely close the end thereof and block the flow of fluid therefrom into said input rotor means, discharge passage means extending generally radially inwardly from said blocked passageway into said fluid discharge passage means so that said blocked passageway taps and scavenges fluid circulating within said unit to completely evacuate the working fluid therefrom when the feed of oil into said unit is stopped.

3. A hydrodynamic unit comprising in combination rotatable input and output means, a rotatable housing operatively connected to said input means, input rotor means operatively connected to said housing, output rotor means operatively connected to said output means and cooperating with said input rotor means to form a torus, said input and output rotor means having fluid entrance and exit sections, a source of pressurized oil for said unit, passage means connecting said source to said entrance section leading into said input rotor means, fluid discharge passage means connecting said unit and said source, said output rotor means comprising a turbine assembly having a plurality of blades disposed therein which provide fluid directing passageways therebetween leading from said entrance section to said exit section of said output rotor means, a plurality of said passageways having a generally transverse wall disposed therebetween to block the flow of fluid therefrom, discharge passage means formed in said blocked passageways directed inwardly to said fluid discharge passage means to allow said blocked passageways to tap the toric oil flow which occurs within said torus of said unit upon rotation of said input rotor means and evacuate said unit of at least a portion of the oil therein in response to the reduction in the supply of the oil to said unit from said source.

4. A variable capacity hydrodynamic unit having fluid supply and fluid discharge passages operatively connected thereto comprising first rotor means having a plurality of blades therein which cooperate to form a plurality of fluid directing passages therein, second rotor means having a plurality of blades therein which cooperate to form a plurality of fluid directing passages therein which direct fluid from said first rotor means back into said second rotor means, at least one of said passages in one of said rotor means having means therein to block the flow of working fluid therethrough, said blocked passage having an exit opening therein which is directly connected to said fluid discharge passage, control means for controlling the feed of working fluid to said unit so that fluid fed into each of said blocked passages flows to said exit opening and said discharge passage so that the mass of the working fluid in said unit can be varied by selectively varying the amount of oil fed to said unit from said source to thereby selectively vary the torque transmitting capacity of said unit.

5. A hydrodynamic fluid unit having fluid supply and fluid discharge passages operatively connected thereto comprising input rotor means having a plurality of blades annularly disposed in a side-by-side relationship about a rotational axis which cooperate to form a plurality of fluid directing passages therein, an output rotor means having a plurality of blades annularly disposed in a side-by-side relationship about said axis which cooperate to form a plurality of fluid directing passages therein for converting energy of fluid circulating thereto by said input rotor means into mechanical torque and for directing fluid back to said input rotor means, a predetermined number of said last mentioned passage means having fluid blocking walls therein to form separate sealed fluid receiving chamber means, radially inwardly extending fluid passage means connecting each said chamber means to said fluid discharge passage, and control means for feeding said unit with liquid at a maximum rate whereby said torque transmitting capacity of said unit is at its highest level and for feeding said unit with liquid at low rate including zero rate whereby said torque transmitting capacity of said unit is at a low level including a complete hydraulic disconnect of said input and output rotor means and whereby said torque transmitting capacity is selectively varied between zero and maximum capacity by correspondingly increasing the liquid flow rate to said unit from zero to a maximum flow rate.

* * * * *